March 16, 1948. G. S. OBERDORF ET AL 2,437,786
TETHER APPARATUS
Filed Sept. 25, 1945
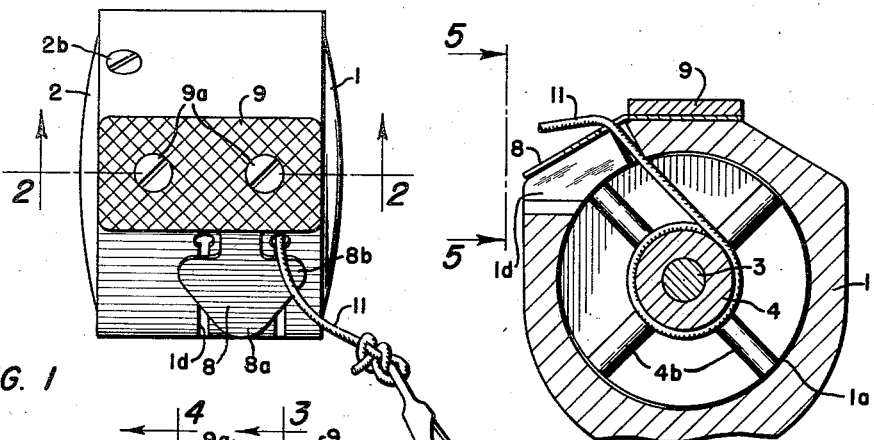
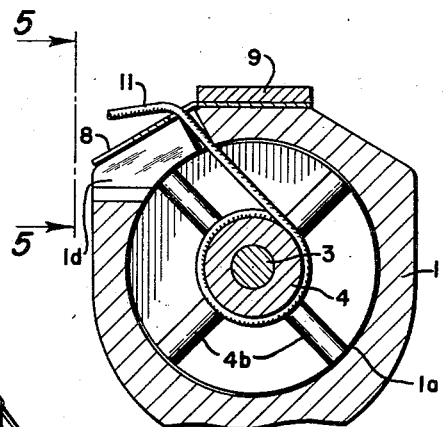
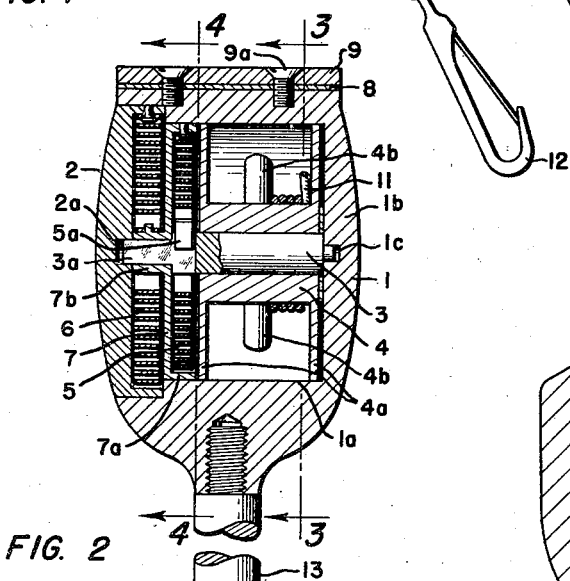
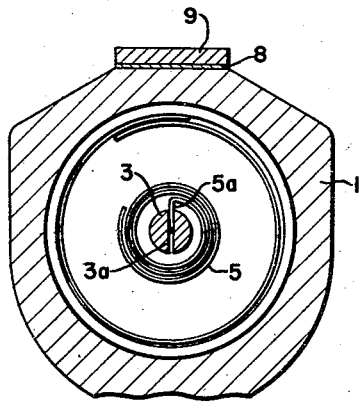
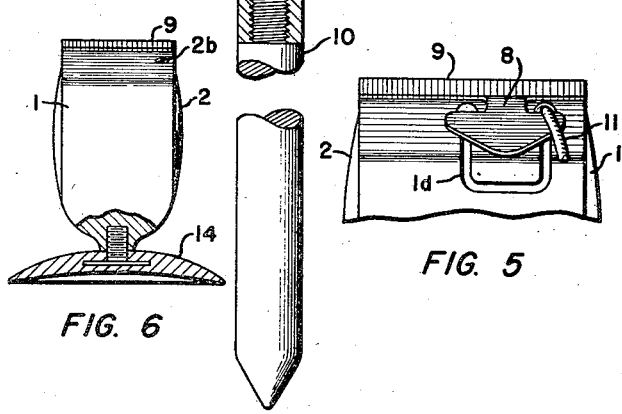
INVENTORS
GEORGE S. OBERDORF &
THELMA J. OBERDORF
BY
A. B. Bowman
ATTORNEY Patented Mar. 16, 1948

2,437,786

UNITED STATES PATENT OFFICE 2,437,786

TETHER APPARATUS

George S. Oberdorf and Thelma J. Oberdorf, Chula Vista, Calif.

Application September 25, 1945, Serial No. 618,561

6 Claims. (Cl. 242—107)

Our invention relates to a tether apparatus more particularly an improvement over our former application Serial No. 586,072 filed April 2, 1945, now Patent No. 2,424,368, and the objects of our improvements are:

First. To provide a tether apparatus of this class employing a novel radius limiting means which permit the cord to be so adjusted that the extension thereof is limited to a certain radius and is automatically retracted to any length shorter than its full length.

Second. To provide a tether apparatus of this class in which a tandem arrangement of graduated coil springs provide a minimum of tension buildup with the extension of the cord to a maximum radius.

Third. To provide a tether apparatus of this class in which the cord winding spool is divided by a plurality of radially extending pegs which permit the cord to be transferred from one end of the spool to the other for limiting the radially extending cord by interference therewith by one of the radially extending pegs limiting further rotative operation of the spool in the extending direction but permitting the coil spring in connection with the spool to retract the cord on the opposite end of the spool from the end on which the cord is secured and wound.

Fourth. To provide a tether apparatus of this class in which a U-shaped slotted portion in the outer casing thereof accommodates the disposition of said cord from one end of the winding spool to the other permitting the operator thereof to place the cord in interference with radially extending pegs located intermediate the end of the spool.

Fifth. To provide a tether apparatus of this class which is very simple and economical of construction, efficient in its action and which will not readily deteriorate or get out of order.

With these and other objects in view as will appear hereinafter, our invention consists of certain novel features of construction, combination and arrangement of parts and portions as will hereinafter be described in detail and particularly set forth in the appended claims, reference being had to the accompanying drawings and to the characters of reference thereon forming a part of this application, in which:

Fig. 1 is a top or plan view of our tether apparatus, Fig. 2 is a vertical sectional view taken from the line 2—2 of Fig. 1 showing parts and portions in elevation to facilitate the illustration, Fig. 3 is a fragmentary sectional view taken from the line 3—3 of Fig. 2, Fig. 4 is a similar view taken from the line 4—4 of Fig. 2, Fig. 5 is a fragmentary elevational view taken from the line 5—5 of Fig. 3, and Fig. 6 is a reduced side elevational view of our leash showing a vacuum cup anchorage means in connection therewith, illustrated in section.

Similar characters of reference refer to similar parts and portions throughout the several views of the drawing.

The casing 1, casing side cover 2, shaft 3, spool 4, coil springs 5 and 6, transfer plate 7, clip 8, top plate 9, spike 10, cord 11, clasp 12 and extension 13 constitute the principal parts and portions of our tether apparatus.

The casing 1 as shown in Figs. 2 and 3 of the drawing is provided with circular and cross section recess portion 1a enclosed at one side by the casing side cover 2. The enclosed side portion 1b of the casing 1 is provided with a bearing recess portion 1c in which one end of the shaft 3 is journalled, as shown best in Fig. 2 of the drawing. The casing side cover 2 is provided with a bearing recess portion 2a in which the opposite end of the shaft 3 is journalled. The spool 4 is fixed on the shaft 3 and is provided with end flange portions 4a and radially extending peg portions 4b positioned intermediate the flange end portions 4a as shown best in Figs. 2 and 3 of the drawing. These radially extending pegs 4b extend to the periphery of the flange portions 4a as shown in Fig. 3 of the drawing. The shaft 3 is provided with a slotted portion in one end arranged to receive the end portion 5a of the coil spring 5 as shown best in Figs. 2 and 4 of the drawing. The opposite end of the coil spring 5 is secured to the transfer plate 7 which is provided with an annular skirt portion 7a surrounding the coil spring 5 and a hub portion 7b freely rotatable on the shaft 3 as shown best in Fig. 2 of the drawing. Secured to the hub portion 7b of the transfer plate 7 is one end of the coil spring 6. The opposite outer end of the coil spring 6 is secured in connection with the casing side cover 2 which is secured in connection with the casing 1 against rotation by means of the screw 2b as shown in Fig. 1 of the drawing. As shown in Figs. 1 and 5 of the drawing the casing 1 is provided with a U-shaped slotted portion 1d through which the cord 11 extends from the spool 4 to which it is secured. The normally vertical portions of this U-shaped slotted portion align with the spool at opposite sides of the pegs 4b permitting transfer of the cord 11 from one vertical portion of the slotted portion 1d to the other whereby the cord 11 may be placed in interfering relationship with the pegs 4b limiting rotation of the spool 4 when operating in the cord extending direction. The clip 8 is secured on the upward side of the casing 1 beneath the top plate 9 by the screws 9a. This clip 8 is provided with a substantially triangular portion 8a two corners of which extend over the vertical portion of said U-shaped slotted portion contiguous with the outer side of the casing 1. The upper ends of the vertical portions of said U-shaped slotted portions are open above the extending portion 8b of the triangular portion 8a. Thus the cord may be shifted from one vertical portion of the slotted portion 1d to the other vertical portion beneath the clip 8 whereby the cord is disposed in angular interfering relation with the pegs 4b. The spike 10 is connected in screw threaded relation with the casing 1 as shown in Fig. 2 of the drawing and is adapted to be driven into the ground by means of a hammer or other instrument on the top plate 9 which is secured in connection with the casing 1 by the screws 9a.

The cord 11 is provided with a clasp 12 to be connected to the belt or clothing of a child or it may be engaged with the cord 11 in a loop around the child or pet as desired. The extension 13 is screw threaded in connection with the casing 1 and spike 10 for extension of the same.

The operation of this tether apparatus is substantially as follows:

The clasp 12 is secured in connection with the cord 11 and may be connected to a harness or other device worn by the child or animal to be tethered by our tether apparatus. When tension is applied to the cord 11 the coil spring 5 is deflected and as it tightens it up the heavier in cross-section coil spring 6 is deflected by means of the interconnecting transfer plate 7 which is secured to the outermost end of the coil spring 5 and the inner end of the coil spring 6. The difference in cross-sectional area of the coil springs 5 and 6 promote the initial deflection of coil spring 5 and subsequent deflection of coil spring 6 whereby a maximum number of revolutions of the spool 4 may be had without building up undue spring tension in connection with the cord 11. As the child or animal in connection with the cord 11 moves about, the spool 4 rotates in connection with the shaft 3 building up tension in the coil springs 5 and 6 when the cord is pulled outwardly which spring tension retracts the cord when slack is available preventing entanglement of the child or animal connected with the cord when moving back and forth and around our tethering apparatus. If it is desired to limit the radius of travel of the child or animal in connection with our tethering apparatus a certain desired length of the cord may be pulled outwardly and forced underneath the clip 8 through the U-shaped slotted portion to the opposite vertical portion thereof whereby the cord 11 crosses one of the pegs 4b in connection with the spool 4 preventing further rotation of the spool 4 due to the engagement of one of the pegs 4b with the cord 11. Thus a shorter radius of travel may be provided if desired which may be any length intermediate the full length of the cord 11. When the cord 11 is placed in the opposite vertical portion of the slotted portion 1d the tension of the coil springs 5 and 6 cause the spool 4 to wind the cord 11 on the opposite side of the pegs 4b when retracting the same whereby normal retraction of the cord 11 is had when a short radius of travel of the child is maintained by shifting the cord 11 in the U-shaped slotted portion 1d as shown in Fig. 5 of the drawing.

The extension 13 is provided for the spike 10 in its screw threaded relation with the casing 1 to be used for anchoring the same in sand or soft soil.

In the modification as shown in Fig. 6, our tether apparatus is shown provided with a resilient vacuum cup 14 for securing the same on a substantially flat surface such as the floor of a room or other similar surface.

Though we have shown and described a particular construction, combination and arrangement of parts and portions we do not wish to be limited to the particular construction, combination and arrangement but desire to include in the scope of our invention the construction, combination and arrangement substantially as set forth in the appended claims.

Having thus described our invention what we claim as new and desire to secure by Letters Patent is:

1. In a tether apparatus of the class described a combination of a casing having a spike in connection therewith adapted to be forced into the ground, a shaft rotatably mounted in said casing, a spool secured in connection with said shaft, a coil spring having its inner end in connection with said shaft, a disc shaped transfer plate connected to the outer end of said coil spring, a second coil spring connected at its inner end to said transfer plate and secured at its outer end to said casing, radially disposed pegs connected to the hub of said spool intermediate the ends thereof, said casing provided with a U-shaped slotted portion in its sidewall, the legs of said U-shaped slotted portion aligned with said spool at opposite sides of said radially disposed pegs.

2. In a tether apparatus of the class described a combination of a casing having a spike in connection therewith adapted to be forced into the ground, a shaft rotatably mounted in said casing, a spool secured in connection with said shaft, a coil spring having its inner end in connection with said shaft, a disc shaped transfer plate connected to the outer end of said coil spring, a second coil spring connected at its inner end to said transfer plate and secured at its outer end to said casing, radially disposed pegs connected to the hub of said spool intermediate the ends thereof, said casing provided with a U-shaped slotted portion in its sidewall, the legs of said U-shaped slotted portion aligned with said spool at opposite sides of said radially disposed pegs, a cord connected to the hub of said spool and one side of said radially disposed pegs and extending through one leg of said U-shaped slotted portion, and adapted to be shifted in said U-shaped slotted portion to the opposite leg thereof across one of said radially disposed pegs in connection with said spool.

3. In a tether apparatus of the class described a combination of a casing having a spike in connection therewith adapted to be forced into the ground, a shaft rotatably mounted in said casing, a spool secured in connection with said shaft, a coil spring having its inner end in connection with said shaft, a disc shaped transfer plate connected to the outer end of said coil spring, a second coil spring connected at its inner end to said transfer plate and secured at its outer end to said casing, radially disposed pegs connected to the hub of said spool intermediate the ends thereof, said casing provided with a U-shaped slotted portion in its sidewall, the legs of said U-shaped slotted portion aligned with said spool at opposite sides of said radially disposed pegs, a cord connected to the hub of said spool and one side of said radially disposed pegs and extending through one leg of said U-shaped slotted portion, and adapted to be shifted in said U-shaped slotted portion to the opposite leg thereof across one of said radially disposed pegs in connection with said spool, clip means engaged with the outer side of said casing and overlapping the legs of said U-shaped slotted portion below the ends thereof whereby said cord emerges from the end of one of said legs of said U-shaped slotted portion above the edge of said clip member.

4. In a tether apparatus of the class described a combination of a casing, a spool rotatively mounted therein having radially extending peg portions connected to the hub thereof intermediate its ends, said casing provided with a U-shaped slotted portion in the sidewall thereof having vertically disposed portions aligned with opposite sides of said peg portions longitudinally of said spool, and a cord secured in connection with said spool and extending through said U-shaped slotted portion at one end thereof and adapted to be shifted in said U-shaped slotted portion across one of said peg portions above the opposite end of said spool, clip means for maintaining said cord in either of the end portions of said U-shaped slotted portion.

5. In a tether apparatus of the class described a combination of a casing, a spool rotatively mounted therein having radially extending peg portions connected to the hub thereof intermediate its ends, said casing provided with a U-shaped slotted portion in the sidewall thereof having vertically disposed portions aligned with opposite sides of said peg portions longitudinally of said spool, and a cord secured in connection with said spool and extending through said U-shaped slotted portion at one end thereof and adapted to be shifted in said U-shaped slotted portion across one of said peg portions above the opposite end of said spool, clip means for maintaining said cord in either of the end portions of said U-shaped slotted portion, a shaft in such casing on which said spool is mounted, a coil spring in connection with said shaft and cooperating with said casing.

6. In a tether apparatus of the class described a combination of a casing, a spool rotatively mounted therein having radially extending peg portions connected to the hub thereof intermediate its ends, said casing provided with a U-shaped slotted portion in the sidewall thereof having vertically disposed portions aligned with opposite sides of said peg portions longitudinally of said spool, and a cord secured in connection with said spool and extending through said U-shaped slotted portion at one end thereof and adapted to be shifted in said U-shaped slotted portion across one of said peg portions above the opposite end of said spool, clip means for maintaining said cord in either of the end portions of said U-shaped slotted portion, a shaft in such casing on which said spool is mounted, a coil spring in connection with said shaft and cooperating with said casing, a transfer plate secured to the outer end of said coil spring having a hub portion rotatable about said shaft, a second coil spring secured to the hub portion of said transfer plate and secured to said casing at its outer end.

GEORGE S. OBERDORF.
THELMA J. OBERDORF.

REFERENCES CITED

The following references are of record in the file of this patent:

UNITED STATES PATENTS

| Number | Name | Date |
| --- | --- | --- |
| 175,446 | Francis | Mar. 28, 1876 |
| 184,663 | Reichert | Nov. 21, 1896 |
| 1,235,092 | Atkinson et al. | July 31, 1917 |
| 1,854,103 | Buhrie | Apr. 12, 1932 |
| 2,211,561 | Flannelly | Aug. 13, 1940 |